Oct. 13, 1931.                G. RUST                1,827,170
PLOWSHARE
Filed May 14, 1929
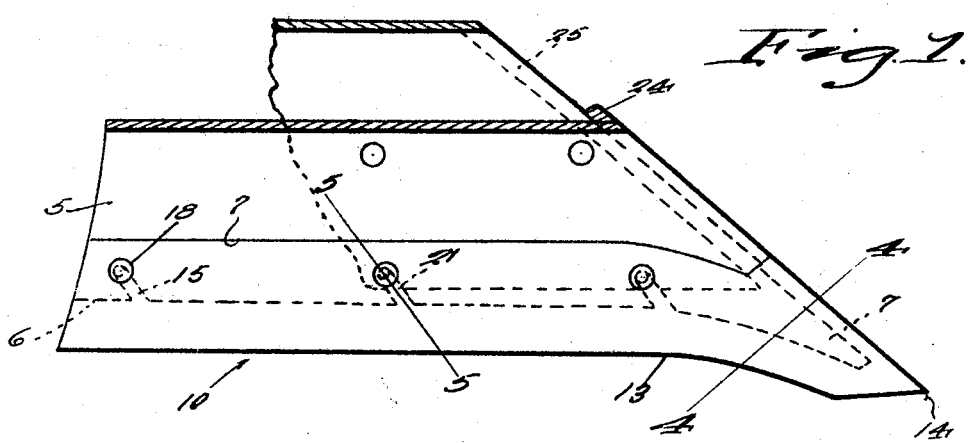
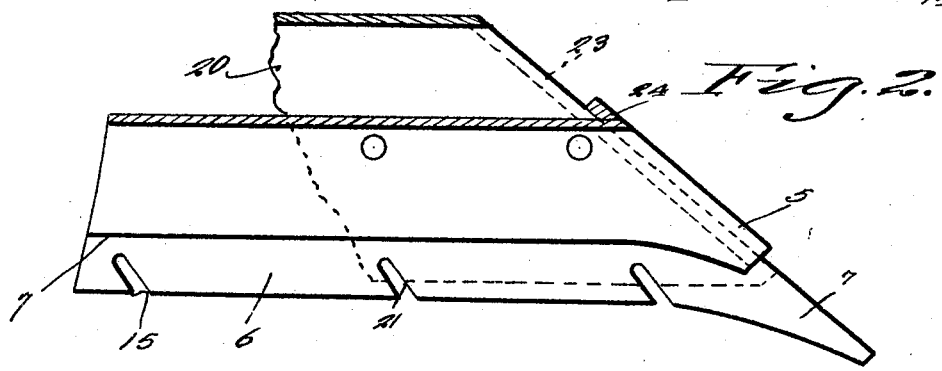
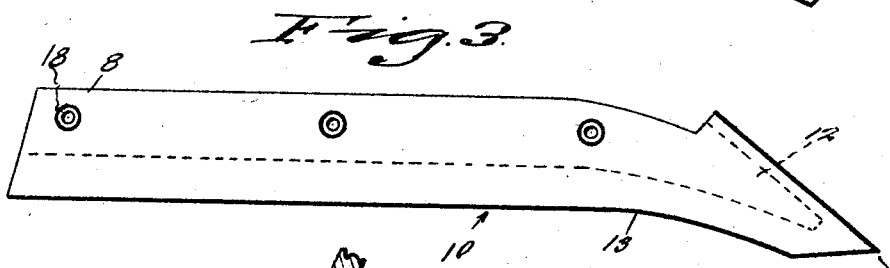
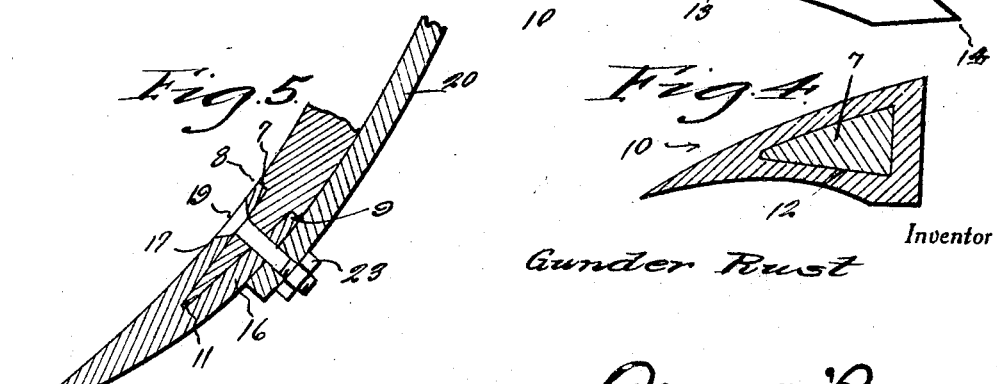
Inventor
Gunder Rust
By Clarence A. O'Brien
Attorney Patented Oct. 13, 1931

1,827,170

UNITED STATES PATENT OFFICE

GUNDER RUST, OF ALKABO, NORTH DAKOTA

PLOWSHARE

Application filed May 14, 1929. Serial No. 362,945.

This invention relates to agricultural implements and is more particularly concerned with plow shares.

The primary object of the invention is to provide an improved sectional share provided with quick detachable connections between the sections whereby that section of the plow share constituting the cutting edge may be quickly and readily removed when it is desired to sharpen the same.

Another very important object of the invention is to provide a plow share of the above mentioned character wherein the several sections may be quickly and readily assembled, which is simple in construction, strong, durable, and thoroughly reliable in use.

Other objects and advantages of the invention will become apparent during a study of the following description taken in connection with the accompanying drawings, wherein:

Figure 1 is a side elevation constructed according to my invention, and showing all of the sections assembled.

Figure 2 is a side elevation of the plow share and the frog associated therewith.

Figure 3 is a side elevation of the cutter blade.

Figure 4 is a cross sectional view, taken on the line 4—4 of Figure 1.

Figure 5 is a cross sectional view, taken on the line 5—5 of Figure 1.

Referring more particularly to the drawings, it will be seen that the share comprises a body portion 5 having a longitudinally extending centrally disposed reduced extension tongue 6, gradually tapered in cross section and forwardly. The said tongue 6 extends forwardly at the inner edge of the portion 1 forming a tongue 7 which tapers from its free edge to its forward end. Where said tongue 6 projects downwardly and forwardly from the body 5, shoulders 8 and 9 are formed longitudinally of the body as clearly shown.

The share also includes a cutter blade 10, which is provided with a substantially V-shaped channel 11, which merges at the forward end of the blade 10 into a downwardly and forwardly extending pocket 12. The blade 10 is also composed of the forward cutting edge 13, which terminates in a sharp point as at 14.

When attention is directed to Figure 2, it will be seen that the said tongues 6 of the body portion 5 is provided with rearwardly inclined notches 15 and it will be seen that when the body 5 and blades 10 are in assembled position, the forwardly extending edge 7 of the body 5 is receivable in the pocket 12, and the tongue 6 is disposed within the V-shaped channel 11. The shoulders 8 and 9 will rest on the upper and lower walls 16 and 17 of the channel 11 as clearly illustrated in Figure 5. The walls 17 and 16 of the channel are further provided with aligned openings 18 through which aligned openings bolts 19 extend transversely of the channel, which bolts 19 are also received in the respective notches 15 formed in the tongue 6, for connecting the body 5 and cutter blade 10 in a secured and rigid manner.

A specially constructed frog 20 is provided on its lower edge with rearwardly inclined notches 21 which notches are adapted to register with the openings 18 formed in the wall 16 of the V-shaped channel. Thus it will be seen that the outer extremities of the bolts 19 are receivable in the said notches 21 and have nuts 23 screw threadedly engaged with the extremities for securing the blade 10, body 5 and frog 20 all in assembled position. It is also to be noted that the body 5 and frog 20 are each provided with sides 24 and 25 respectively.

From the foregoing then, it will be seen that I have provided a sectional plow share which is fully capable of attaining the hereinbefore mentioned objects in a thoroughly reliable, practical and efficient manner.

Even though I have herein shown and described certain detail elements of my invention, it is to be understood that the same is susceptible to certain changes fully comprehended by the scope of the invention as herein described and the annexed claims.

What is claimed is:

1. In a sectional plow share, a body section having a longitudinally extending centrally disposed reduced tongue tapering in cross section downwardly, said tongue being extended at one end in a downwardly and forwardly directed portion, said portion tapering from its rear to its forward end, a cutter blade section having a correspondingly tapered longitudinally extending channel adapted to receive said tongue, said channel being formed at one end with a downwardly and forwardly extending socket adapted to receive the downwardly and forwardly directed portion of said tongue, rearwardly inclined notches formed on the tongue, and bolts extending tranversely through said channel and with which the notches are adapted to engage for securing said body section and blade section together in interlocked position.

2. In a sectional plow share, a body section having a longitudinally extending centrally disposed tongue extending downwardly therefrom and provided with rearwardly inclined notches, a cutter blade section having a longitudinally extending recess adapted to receive the tongue, aligned apertures formed in the walls of the recess, bolts adapted to extend through the aligned apertures and the notches in the tongue, and a frog adapted to extend along one face of said body section and said blade section, said frog having inclined notches formed thereon and engageable with the bolts to provide an interlocking connection between the respective sections and the frog.

In testimony whereof I affix my signature.

GUNDER RUST.